(12) United States Patent
Stotts et al.

(10) Patent No.: US 7,140,560 B2
(45) Date of Patent: Nov. 28, 2006

(54) NOZZLE ASSEMBLY WITH FUEL TUBE DEFLECTOR

(75) Inventors: Robert E. Stotts, Newark, NY (US); Brian T. Drake, Chardon, OH (US); Curtis H. Scheuerman, Chardon, OH (US); Kiran Patwari, Highland Heights, OH (US)

(73) Assignee: Parker-Hannifin Corporation, Cleveland, OH (US)

(\*) Notice: Subject to any disclaimer, the term of this patent is extended or adjusted under 35 U.S.C. 154(b) by 137 days.

(21) Appl. No.: 10/948,935

(22) Filed: Sep. 24, 2004

(65) Prior Publication Data

US 2005/0067506 A1 Mar. 31, 2005

Related U.S. Application Data

(60) Provisional application No. 60/506,565, filed on Sep. 26, 2003.

(51) Int. Cl.
| | |
|---|---|
| B05B 1/26 | (2006.01) |
| B05B 1/34 | (2006.01) |
| B05B 7/06 | (2006.01) |
| F02M 61/00 | (2006.01) |
| F02M 63/00 | (2006.01) |

(52) U.S. Cl. ............... 239/461; 239/463; 239/467; 239/504; 239/533.2; 239/403; 239/429; 239/432

(58) Field of Classification Search .............. 239/461, 239/463, 467, 504, 533.2, 403, 429, 432, 239/399, 423, 424, 424.5, 430, 431, 434.5, 239/523, 524, 533.12; 60/740
See application file for complete search history.

(56) References Cited

U.S. PATENT DOCUMENTS

| | | | | | |
|---|---|---|---|---|---|
| 4,962,889 | A | * | 10/1990 | Halvorsen | ............... 239/410 |
| 5,351,477 | A | * | 10/1994 | Joshi et al. | .............. 60/39.463 |
| 5,605,287 | A | * | 2/1997 | Mains | ............... 239/402 |
| 5,630,319 | A | * | 5/1997 | Schilling et al. | ............... 60/747 |
| 5,761,907 | A | * | 6/1998 | Pelletier et al. | ............... 60/740 |
| 6,427,930 | B1 | * | 8/2002 | Mei et al. | ............... 239/403 |

\* cited by examiner

*Primary Examiner*—Dinh Q. Nguyen
*Assistant Examiner*—Darren Gorman
(74) *Attorney, Agent, or Firm*—Christopher H. Hunter (57) ABSTRACT

A deflector at the downstream end of a fuel tube deflects incoming fuel into an annular fuel channel in a fuel swirler of an injector. The deflector prevents direct impact of the cooler fuel on the exposed walls of the swirler body. The deflector can be formed by a tab or other integral portion of the heatshield, or as a separate piece fixed to the heatshield or swirler body. The deflector minimizes disruption of flow through any flow slots that are covered by the deflector, and may have i) a relatively small circumferential extent, such that the deflector covers only a few flow slots, ii) flow openings or slots that allow a portion of the fuel to flow inwardly of the deflector into the otherwise covered flow slot(s), or iii) a space or gap between the side(s) of the deflector and the inner walls of the annular channel.

24 Claims, 8 Drawing Sheets

NOZZLE ASSEMBLY WITH FUEL TUBE DEFLECTOR

CROSS-REFERENCE TO RELATED CASES

The present application claims the benefit of the filing date of U.S. Provisional Application Ser. No. 60/506,565; filed Sep. 26, 2003, the disclosure of which is expressly incorporated herein by reference.

FIELD OF THE INVENTION

This invention relates in general to injectors for dispensing fluids in streams or sprays, and more particularly relates to fuel nozzles for dispensing liquid or gaseous fuel for ignition in an aircraft or power generating engine.

DESCRIPTION OF THE PRIOR ART

When fuel flows through a delivery tube or conduit to a fuel injector in an aircraft engine, the fuel entering the nozzle from the manifold is generally significantly cooler than the surrounding injector structure. This is because the high velocity, hot compressed combustion air flowing downstream through the nozzle from the compressor is in some cases at a temperature greater than 800 degrees Fahrenheit; while the incoming fuel from the fuel tank can be at a temperature less than 150 degrees Fahrenheit. In certain applications, the cold fuel from the inlet tube is directed into an annular fuel delivery channel or passage outwardly surrounding a swirler. The channel is designed to direct the fuel substantially evenly around the nozzle and then allow it to flow radially inward into angled flow slots, where the fuel is then dispersed through axial openings downstream in a swirling stream or spray.

The annular fuel delivery channel is formed in the outer surface of the swirler body. A heat shield is typically used in the annular fuel deliver channel to i) enclose the open, outer side of the channel; and ii) protect the fuel from the elevated temperatures in the nozzle. The heatshield is necessarily formed in a U or C-shaped cross section, with the side walls of the heat shield inserted between the opposed walls of the channel, and the end wall of the heatshield enclosing the open, outer side of the channel. The opposite, open side of the heatshield between the side walls faces the fuel slots of the swirler, which are typically evenly spaced around the inner surface of the channel. The C or U-shaped design of the heatshield is necessary to avoid obstructing the fuel flow to the slots.

Alternatively, the heatshield can be a closed or continuous structure, with openings formed in the inner wall of the heatshield to allow fuel to reach the flow slots. However as can be appreciated, the manufacture and assembly of such a heatshield then becomes a time-consuming process, and the heatshield then requires careful installation into the nozzle to align the openings in the heatshield with the fuel slots in the swirler. The openings must also be brazed or otherwise sealed to the swirler, to avoid fuel leaking between the heatshield and swirler. In all, this is a less desirable technique than using a C or U-shaped heatshield.

However, with a C or U-shaped heatshield, the discharge end of the fuel delivery tube, which is received and fixed in an opening in the outer end wall of the heatshield, directs fuel inwardly against the opposite, exposed side of the channel, where the fuel is then diverted around the entire circumference of the channel. The cold fuel from the delivery tube creates a localized "cold spot" in the swirler body across from the delivery tube, which can cause thermal stress in the injector. Such stress is undesirable in many instances.

SUMMARY OF THE INVENTION

The present invention overcomes at least some of the above drawbacks and prevents or at least reduces the thermal stresses associated with the introduction of cooler inlet fuel into the swirler body of a fuel injector. According to the present invention, a deflector is located at the downstream end of the fuel discharge tube, and deflects all or a portion of the incoming fuel into the annular fuel delivery channel, where the fuel then flows evenly around the channel to the flow slots. The deflector prevents direct impact of the cooler fuel on the exposed swirler body, but does not detrimentally effect the flow of fuel into the flow slots in the swirler.

According to one embodiment of the invention, the deflector is formed by a tab or other integral portion of the heatshield. In a second embodiment, the deflector may be a separate piece fixed such as by brazing or welding to the heatshield, or to the swirler body itself. In either embodiment, the deflector is adjacent or proximate the discharge end of the fuel delivery tube, and has a dimension or design that minimizes disruption of the flow through any of the flow slots that are covered by the deflector. In one form of the invention, the deflector may have a relatively small circumferential extent, such that the deflector covers only one or at most two flow slots, and fuel can easily pass around the end of the deflector and back to the covered flow slot(s) with negligible pressure drop. In another form of the invention, the deflector can have a more substantial circumferential extent, and include flow openings or slots along its extent (spaced away from the area directly across from the discharge end of the inlet tube) that allow a portion of the fuel to flow inwardly of the deflector into the otherwise covered flow slot(s). According to yet another form of the invention, a space or gap can be provided between the side(s) of the deflector and the inner walls of the annular channel, to allow a portion of the fuel to flow around the sides of the deflector to the covered flow slots.

As should be appreciated, the deflector in any of the embodiments is a simple, robust component that is relatively easy to manufacture or fabricate, and which prevents or at least minimizes the thermal stresses associated with the cooler fuel entering the hotter swirler body of the injector. Further features of the present invention should become apparent to those skilled in the art upon reviewing the following specification and attached drawings

DETAILED DESCRIPTION OF THE PREFERRED EMBODIMENT

Figure 1:
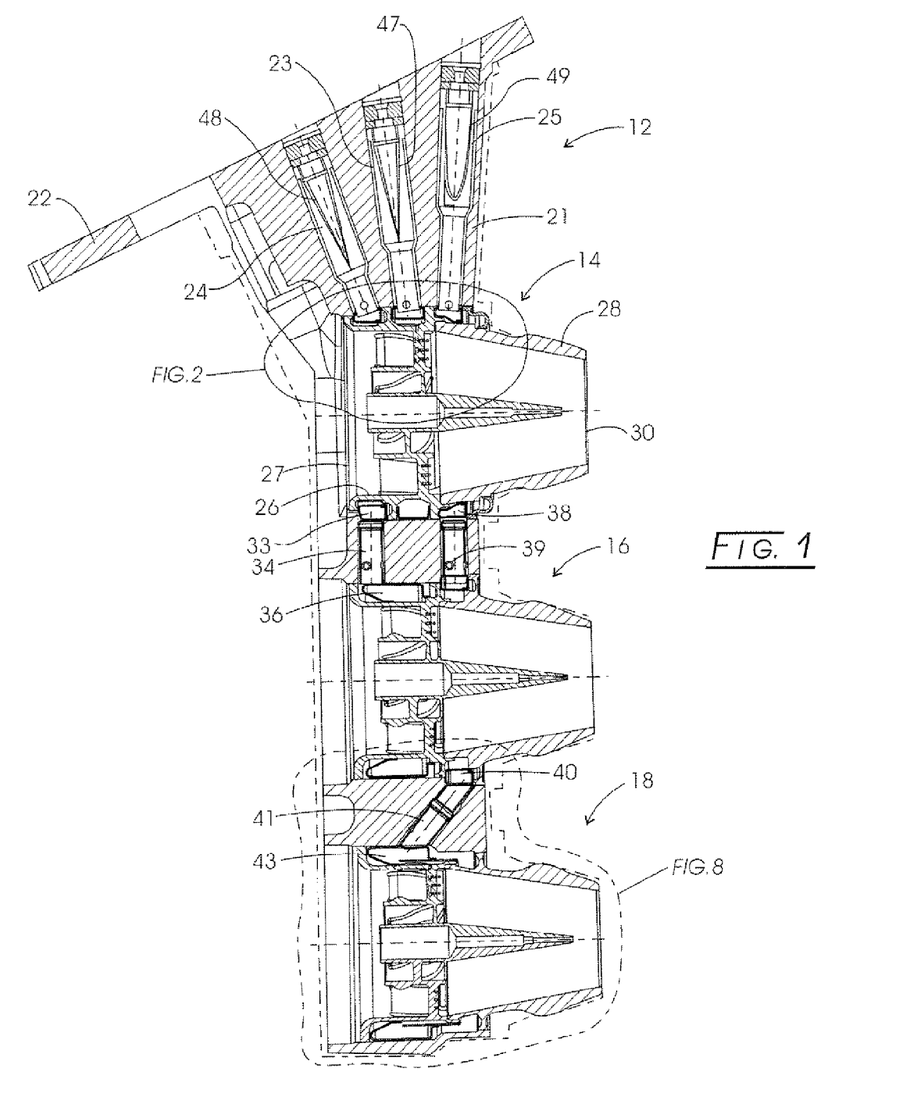
FIG. 1 is a cross-sectional side view of a fuel injector illustrated with three nozzle assemblies, constructed according to a first embodiment of the present invention.

Referring to the drawings, and initially to FIG. 1, a fuel injector assembly constructed according to the principles of the present invention is indicated generally at 12. The injector assembly is illustrated as having three nozzle assemblies, indicated generally at 14, 16 and 18, however it should be appreciated that this is for exemplary purposes only, and that the injector could have one, two or any number of nozzle assemblies that receive fuel from a manifold. Also, while a particular nozzle assembly will be described below, it should also be appreciated that this is also for exemplary purposes only, and that the present invention could be appropriate for a wide variety of nozzle structures and configurations.

In any case, the injector assembly 12 includes an injector body or stem 21 with a flange or mounting bracket 22, for mounting the injector to an upstream wall of a combustion chamber in a turbine engine; and a series of fuel passages 23, 24, 25, individually fluidly interconnecting the manifold (not shown) with each of the nozzle assemblies 14, 16, 18, respectively. Each nozzle assembly 14, 16, 18 directs a combination of gaseous or liquid fuel and air downstream into the combustion chamber for burning, as should be well known to those skilled in the art. The combustion chamber can be any useful type of combustion chamber, such as a combustion chamber for an aircraft engine; however, the present invention is believed useful for combustion chambers for other types of combustion applications, such as in ground vehicles or industrial power generation, where a stream or dispersion of fuel droplets is necessary. The combustion chamber will not be described herein for sake of brevity, with the exception that as should be known to those skilled in the art, air is compressed, and passes at high temperatures and velocities through the nozzles assemblies 14, 16, 18 of the injector, where the air is mixed with fuel, and then directed downstream into the combustion chamber and ignited, so that the expanding gases of combustion can rapidly move across and thus rotate turbine blades (not shown). While a single injector assembly 12 is shown in FIG. 1, it should be appreciated that multiple injector assemblies could be used mounted to the combustor, such as in an annular array.

The nozzle assemblies 14, 16, 18 have some general similarities, and only nozzle assembly 14 will be discussed in detail for sake of brevity. Nozzle assemblies 14, 16, 18 are each connected directly through the individual fuel passages to the fuel manifold to receive fuel from the tank. A valve (not shown) upstream from the manifold controls the flow of fuel through the nozzle assemblies. Fuel passage 23 directly feeds an annular fuel channel 32 located about midway along upstream nozzle assembly 14; while fuel passage 24 feeds an annular passage 33 surrounding the upstream end of nozzle assembly 14 which is fluidly connected by fuel passage 34 to an annular fuel delivery channel 36 in nozzle assembly 16.

Similarly, fuel passage 25 feeds an annular passage 38 surrounding the downstream end of nozzle assembly 14, which is fluidly connected by passage 39 to an annular passage 40 at the upstream end of nozzle assembly 16, and then by a passage 41 to an annular fuel delivery channel 43 in nozzle assembly 18. Each fuel delivery passage 23–25 preferably includes an internal tube 44–46 (FIG. 2), respectively, which provides thermal protection for the passage. Appropriate screen and throttling assemblies 47–49 can be located in the upstream portion of the tubes 44–46 as a final filter for any impurities, as well as to control the fuel flow through the passages.

It is pointed out that the first, upstream nozzle assembly 14 has the most significant issue with thermal stress caused by incoming fuel, as this is the nozzle assembly that initially receives fuel from the manifold, and the fuel is heated somewhat as it passes through the first nozzle assembly 14 to the downstream nozzle assemblies 16, 18, and the difference between the fuel temperature and the surrounding temperature becomes less of an issue, although the principles of the present invention can also be applied to both of the remaining nozzle assemblies 16, 18 in the injector.

Figure 2:
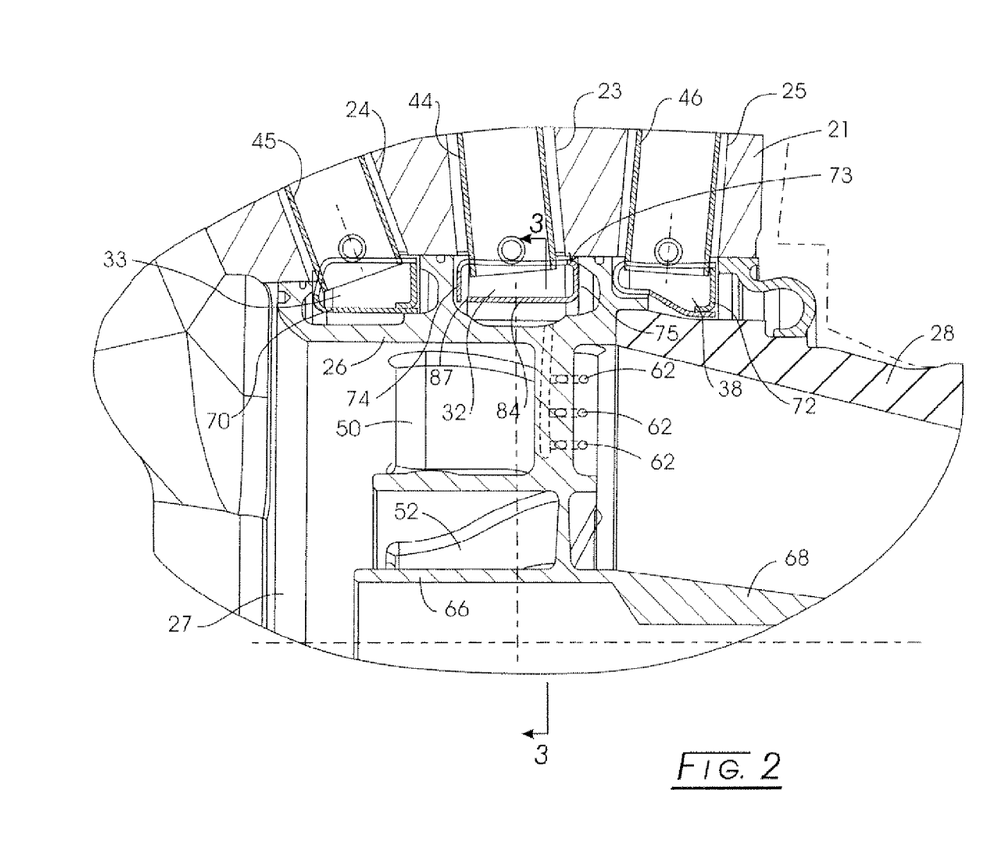
FIG. 2 is an enlarged, cross-sectional side view of a portion of one of the nozzle assemblies of the fuel injector.
Figure 3:
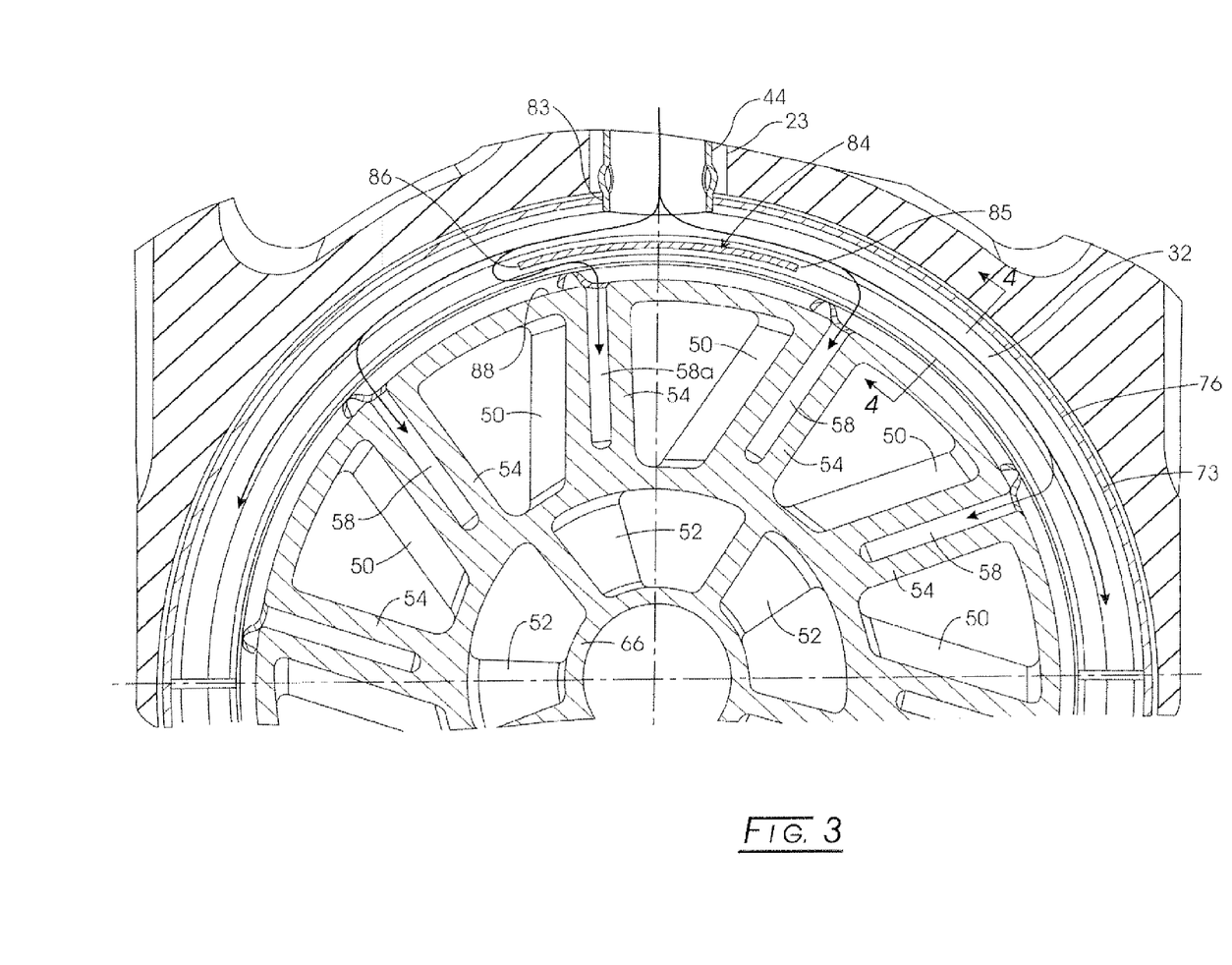
FIG. 3 is an enlarged, cross-sectional end view of a portion of the one nozzle assembly taken substantially along the plane defined by the lines 3—3 in FIG. 2.

Referring now also to FIGS. 2 and 3, which illustrate a portion of nozzle assembly 14 in more detail, the nozzle assembly 14 includes a swirler body 26 having an annular configuration, with an upstream open end 27 receiving combustion air; and a tapered shroud 28 having a downstream end 30 directing the swirling fuel mixture downstream into the combustor for ignition. A series of angled, radial inner and outer swirler vanes 50, 52 are supported in the swirler body. The swirler vanes are supported on a spoke structure 54, each spoke of which includes an internal radial slot or passage 58 opening to an inner wall surface of and fluidly connecting the annual channel 32 with a series of discharge passages 62, oriented to dispense the fuel in a downstream, direction. It should be appreciated that fuel dispensed through discharge passages 62 is caused to have swirling component of motion by virtue of the air passing over swirler vanes 50, and passing downstream through the nozzle assembly into the fuel streams. While ten spokes 54 are illustrated in FIG. 3, it should be appreciated that this is only for exemplary purposes, and that more or less spokes could be used in particular situations.

A centerbody 66 is supported by the spoke structure 54, and includes a tapered downstream passage 68 to direct a stream of air centrally within the nozzle assembly to stabilize and locate the flame, as is known in the art, for example, as described in U.S. Pat. No. 5,351,477, which is incorporated herein by reference.

Nozzle assemblies 16 and 18 are substantially similar, and share many of the attributes and structure of nozzle assembly 14, and again, will not be described further herein for sake of brevity. A similar arrangement of nozzle assemblies in a fuel injector is shown and described in U.S. Pat. No. 5,630,319, which is also incorporated herein by reference.

As is known in the art, appropriate heatshielding is provided in the passages 32, 33, 34, 36, 38, 39, 40, 41 and 43 in the nozzle assemblies. For the passages 33, 34, 38, 39, 40, 41 that are not interrupted by flow slots, the heatshield can be a continuous tube or annulus (see, e.g., heatshields 70, 72 in passages 33 and 38, respectively, in FIG. 2), formed from appropriate metal material, and in one or more pieces completely shielding the entire passage. Each heatshield is brazed or welded at its ends to an adjacent heatshield segment.

Figure 4:
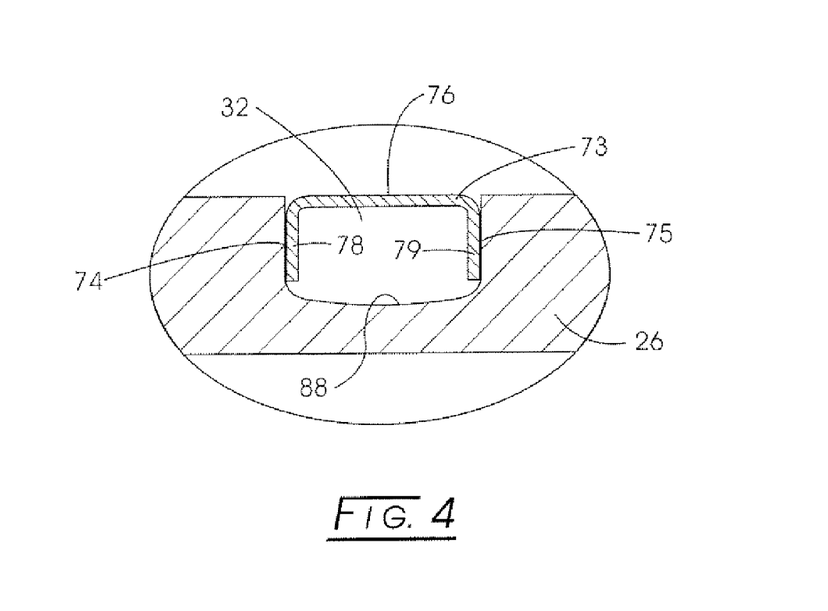
FIG. 4 is a cross-sectional view of a portion of the nozzle assembly, taken substantially along the plane described by the lines 4—4 in FIG. 3.

For annular flow channels 32, 36 and 43, which are intersected by flow slots 58 in spokes 54 of each respective swirler, the heatshield has a C or U-shaped configuration, which is typically formed in two substantially identical halves, each of which extends about 180 degrees and located against opposite sides of the swirler body (to form a completely encircling heatshield). As shown in FIG. 4, heatshield 73 is located in annular channel 32, and includes opposing flat and generally parallel side walls 78, 79 located against the opposing side walls 74, 75 of the channel; and a flat end wall 76, generally perpendicular and interconnecting the side walls, and enclosing the open side of the channel. The heat shield can be fixed to the swirler body 26 in any appropriate manner, such as by brazing or welding.

Figure 5:
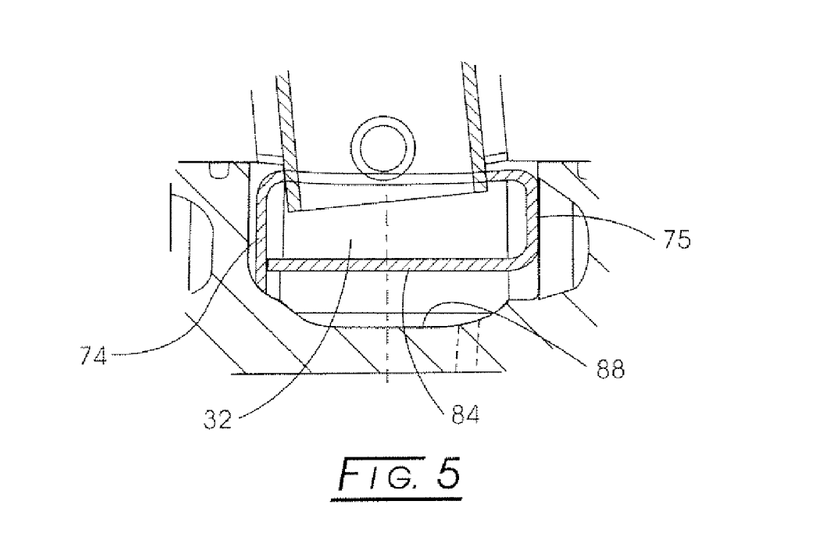
FIG. 5 is a cross-sectional view of a portion of the nozzle assembly, according to a further aspect of the first embodiment.

As can be seen in FIG. 3, the fuel delivery tube 44 in fuel passage 23 intersects the end wall 80 of the heatshield 73, and is received and fixed (such as by brazing or welding) in an appropriately-sized opening 83. In the area adjacent the discharge end of the fuel delivery tube 44 in fuel passage 23, a deflector 84 is provided, which as can be seen particularly in FIG. 2, in one embodiment is formed integral, and preferably unitarily with the heatshield 73. The deflector 84 comprises a tab or other geometry that deflects or diverts all or at least a portion of the incoming fuel from tube 44 into the annular channel 32. The deflector 84 is illustrated in FIG. 3 as extending along a portion (approximately 20 degrees) around the circumference of the channel 32, although the circumferential extent of the deflector can be varied depending upon the desired deflection of fuel. The deflector 84 can be formed with the heat shield by stamping or cutting, and bending inwardly a portion of the heatshield (particularly along one of the side walls 74, 75), or by forming one of the walls so as to have an additional portion of material, and then bending that portion inwardly to form the deflector. The deflector 84 could also be formed as a separate component and fixed, such as by welding or brazing to a sidewall of the heat shield. The deflector can extend across the heat shield from one side wall to the other (as illustrated in FIG. 5), and force the fuel delivered through tube 44 to divert approximately 90 degrees and then travel outwardly along the length of the deflector, until the fuel reaches the respective ends 85, 86 (see, e.g., FIG. 3); or the deflector could only extend a portion of the distance from one side wall to the other (as illustrate in FIG. 2), such that a portion of the fuel can also pass between a gap formed between the side edge 87 of the deflector and the adjacent side wall 74, as well as flowing down to the ends of the deflector.

The deflector 84 is in any event preferably spaced outwardly from the inside wall surface 88 of the channel 32, which allows the fuel to pass to any of the flow slots covered by the deflector, such as fuel slot 58a in FIG. 3, without significant pressure drop. The circumferential extent of the deflector 84, spacing from the opposing sidewall (if any) and distance from the inside wall surface 88 of the channel 32 can vary depending upon the particular application, and can be relatively easily determined, as should be appreciated by those skilled in the art.

The deflector 84 thereby directs and diverts the incoming fuel in tube 44 to prevent the fuel from directly impacting the opposing wall surface 88 of the fuel channel 32, across from the discharge end of the tube. The fuel will be diverted circumferentially around the channel, and enter the channel without creating a localized "cold spot".

Figure 6:
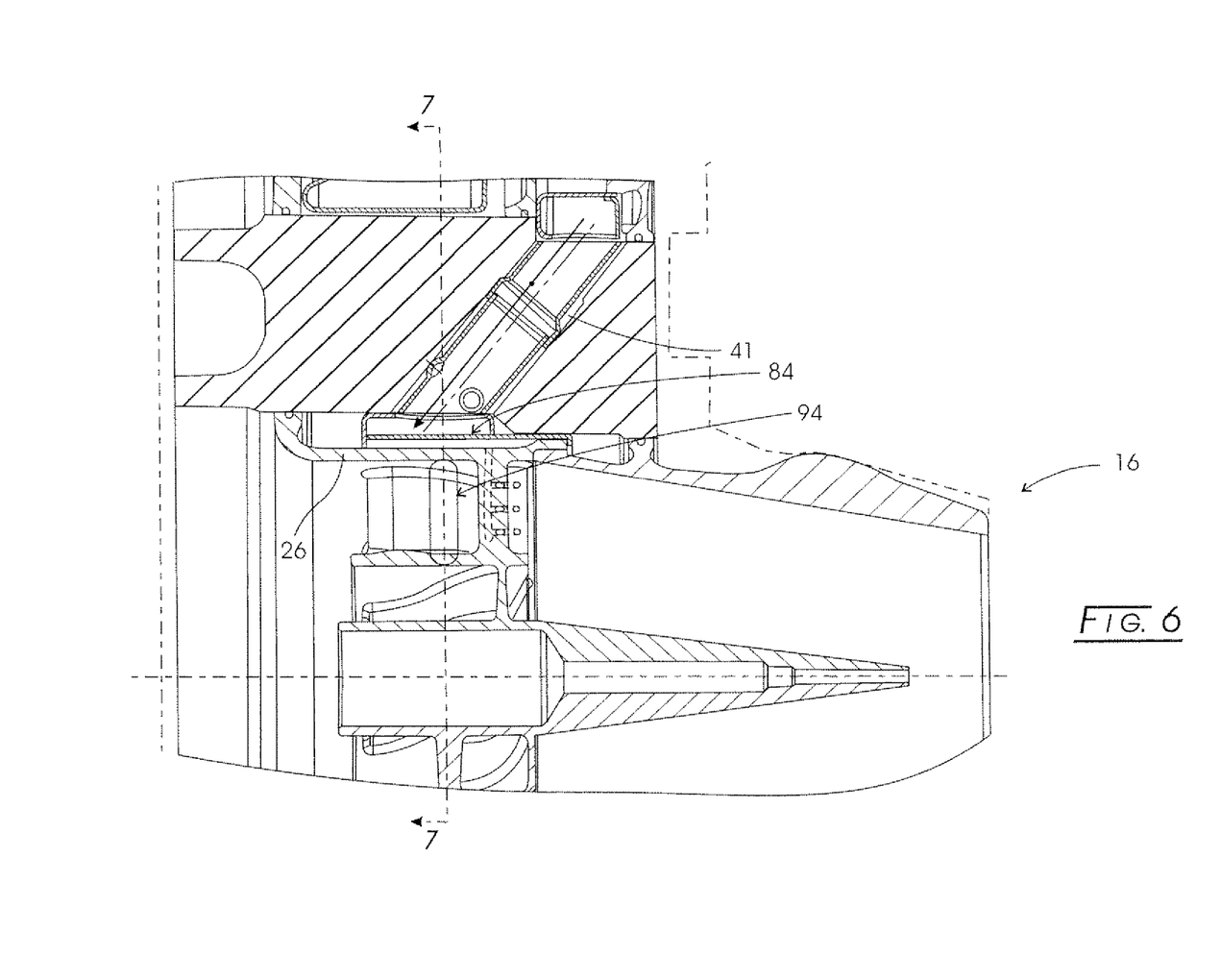
FIG. 6 is an enlarged, cross-sectional side view of a portion of another nozzle assembly, according to a second embodiment of the invention.
Figure 7:
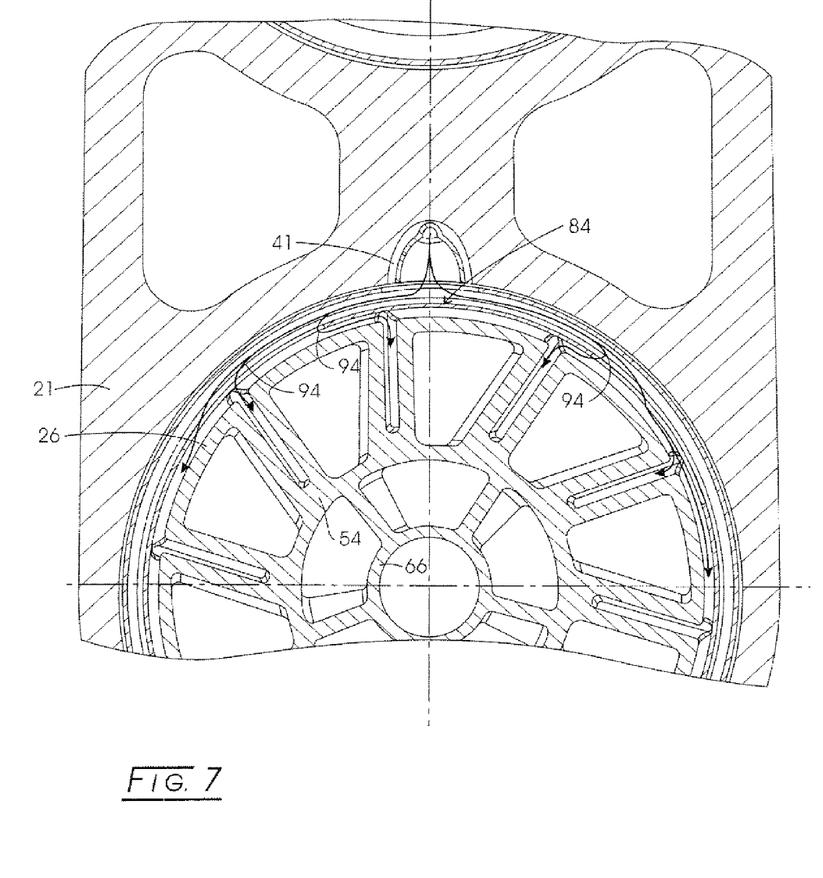
FIG. 7 is an enlarged, cross-sectional end view of a portion of the other nozzle assembly, taken substantially along the plane described by the lines 7—7 of FIG. 6.

Referring now to FIGS. 6 and 7, a second embodiment of the present invention is shown, where the deflector 84 is shown as a separate piece from the heatshield. In this case, which is shown in conjunction with nozzle assembly 18 (although it could just as well be for nozzle assemblies 14 or 16), the deflector 84 has a substantially flat, annular shape extending from sidewall to sidewall of the channel, that is fixed, such as by brazing or welding to the swirler body 26. The deflector 84 can extend only a short circumferential distance around the channel 32, as described above with respect to FIG. 5; or as illustrated, the deflector can alternatively extend a greater extent around the channel, and even the entire extent of the channel, and include a series of slots or openings 94 along its length. The slots or openings 94, which are spaced appropriately along the deflector, preferably apart from the area directly across from the discharge end of the fuel tube, and adjacent the corresponding fuel slots 58 in the swirler, allow fuel to pass through the deflector and reach the fuel slots 58 in the spokes of the swirler, without significant pressure drop.

Figure 8:
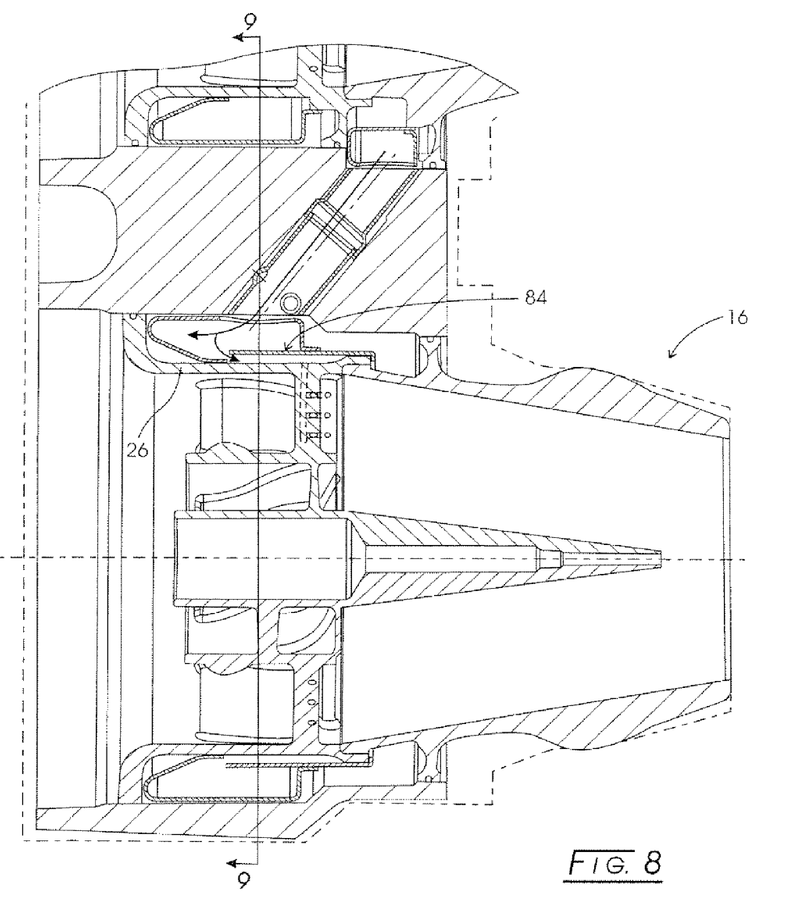
FIG. 8 is an enlarged, cross-sectional side view of a portion of the other nozzle assembly, according to a further aspect of the second embodiment of the invention.
Figure 9:
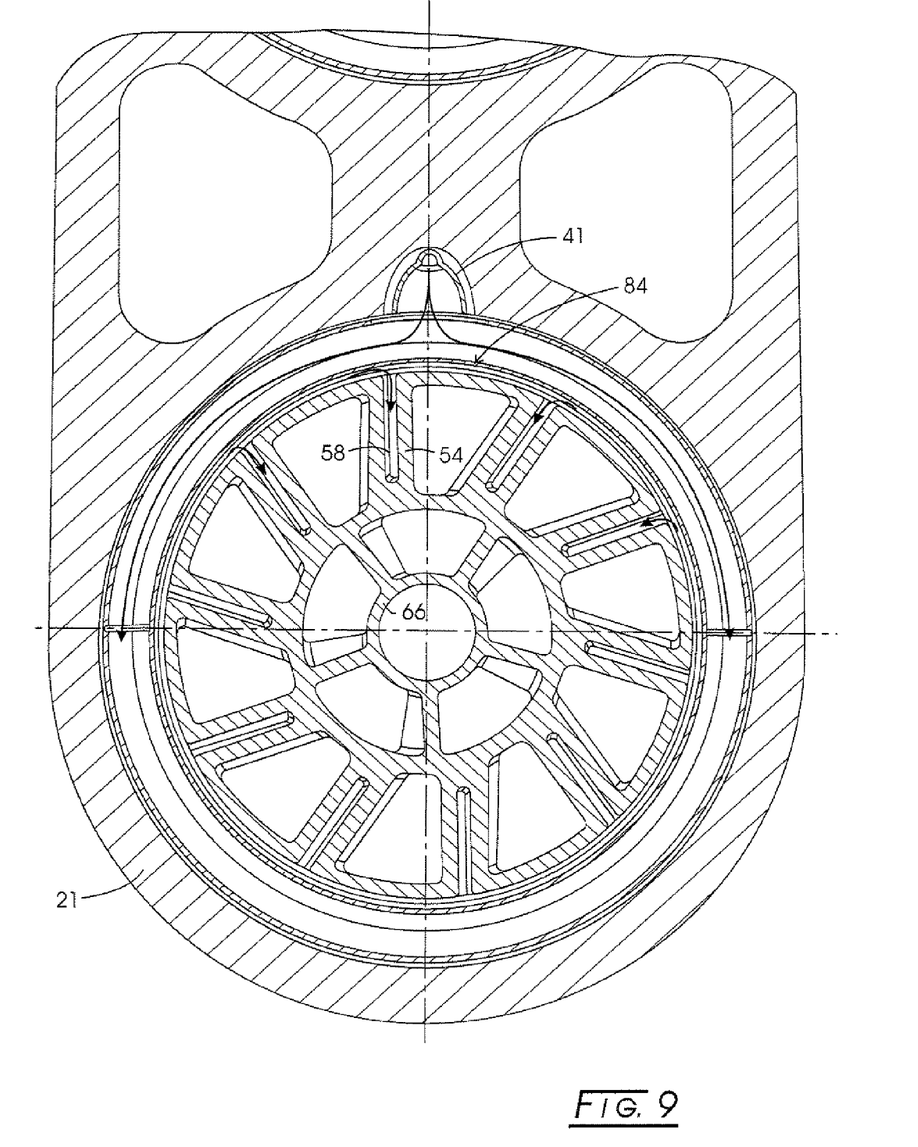
FIG. 9 is an enlarged, cross-sectional end view of a portion of the other nozzle assembly taken substantially along the plane defined by the lines 9—9 in FIG. 8.

Alternatively, as illustrated in FIGS. 8 and 9, the deflector 84 could be a separate piece from the heatshield and fixed directly to the swirler body, but be spaced from one of the sidewalls as described above with respect to FIG. 3, to allow fuel to flow around the side edges of the heatshield to reach the underlying fuel slots 58 without significant pressure drop. As should be appreciated, there are a number of variations of deflector configuration that can achieve the desired result of deflecting the incoming, cooler fuel, so as to be directed into the annular fuel channel without creating a localized cool spot in the swirler body.

And as should be appreciated, the deflector in any of the embodiments described above is a simple, robust component that is relatively easy to manufacture or fabricate, and which prevents or at least minimizes the thermal stresses associated with the cooler fuel entering the hotter swirler body of the injector.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A fuel injector, comprising:
a stem supporting: i) a nozzle assembly having an annular swirler body with an annular fuel channel formed in an outer surface thereof and having an open side; ii) a fuel tube directing fuel to the annular fuel channel of the swirler body at a specific location along the channel; iii) a heat shield having a pair of spaced-apart side walls interconnected by an end wall, and an open side, the heat shield located in the annular fuel channel of the swirler body to enclose the fuel channel; and iv) a deflector positioned along the heat shield in opposing relation to a discharge end of the fuel tube, so as to divert incoming fuel from the fuel tube into the annular fuel channel.

2. The fuel injector as in claim 1, wherein the deflector is formed unitary with the heat shield.

3. The fuel injector as in claim 1, wherein the deflector is formed as a separate piece from the heat shield and permanently fixed thereto.

4. The fuel injector as in claim 1, wherein the deflector is formed as a separate piece from the heatshield and is permanently fixed to the swirler body.

5. The fuel injector as in claim 1, wherein the deflector extends along a predetermined circumferential extent of the fuel channel, and has a width extending from one side to the other of the channel.

6. The fuel injector as in claim 1, wherein the deflector extends along a predetermined circumferential extent of the fuel channel, and has a width defining a gap between a side edge of the deflector, and a sidewall of the fuel channel.

7. The fuel injector as in claim 1, wherein the deflector has one or more slots along its length to allow fuel to pass through the deflector.

8. The deflector as in claim 7, wherein the slots are located along the deflector at a location spaced from the discharge end of the fuel tube.

9. The fuel injector as in claim 1, wherein the heatshield has an annular C- or U-shape, with the open end of the heat shield facing the inner wall surface of the fuel channel.

10. The fuel injector as in claim 1, wherein the deflector is outwardly spaced from an inner end wall surface of the fuel channel, so that fuel can flow around the deflector and then between the deflector and the end wall surface of the fuel channel.

11. A fuel injector, comprising:
a stem including a mounting flange, a nozzle assembly, and a fuel passage internal to the stem providing a fuel path through the stem to the nozzle assembly, said nozzle assembly having a central body with a fuel channel circumscribing an outer surface thereof and having an open side; ii) a fuel tube in the fuel passage with a discharge end directing fuel to the fuel channel of the swirler body at a specific location along the channel; iii) a C or U-shaped heat shield having a pair of spaced-apart side walls interconnected by an end wall, the heat shield located in the annular fuel channel of the central body with the sidewalls of the heat shield adjacent opposing sidewalls of the channel and the end wall of the heat shield opposite and spaced-apart from an inner end wall of the channel, and enclosing the open side of the channel; and iv) a deflector positioned between the end wall of the heat shield and the opposite end wall of the channel, in opposing relation to the discharge end of the fuel tube and in spaced-apart relation from the opposite end wall of the channel to allow fuel flow between the deflector and the opposite end wall, wherein the deflector diverts incoming fuel from the fuel tube into the fuel channel and prevents a localized cold spot from being formed in the body directly across the channel from the discharge end of the fuel tube by cooler fuel received through the tube being applied directly against the fuel channel of a warmer body.

12. The fuel injector as in claim 11, wherein the deflector is formed unitary with the heat shield.

13. The fuel injector as in claim 11, wherein the deflector is formed as a separate piece from the heat shield and permanently fixed thereto.

14. The fuel injector as in claim 11, wherein the deflector is formed as a separate piece from the heatshield and is permanently fixed to the central body.

15. The fuel injector as in claim 11, wherein the deflector extends along a predetermined circumferential extent of the fuel channel, and has a width extending from one side to the other of the channel.

16. The fuel injector as in claim 11, wherein the deflector extends along a predetermined circumferential extent of the fuel channel, and has a width defining a gap between a side edge of the deflector, and one of the sidewalls of the fuel channel.

17. The fuel injector as in claim 11, wherein the deflector has one or more slots along its length to allow fuel to pass through the deflector and between the deflector and the opposite wall of the fuel channel, and wherein the slots are located along the deflector at a location spaced from the discharge end of the fuel tube.

18. A fuel injector, comprising:
a stem including a nozzle assembly, and a fuel passage internal to the stem providing a fuel path through the stem to the nozzle assembly, said nozzle assembly including a swirler body with an annular fuel channel; ii) the fuel path directing fuel to the fuel channel of the swirler body at a specific location along the channel; and iii) a heat shield assembly providing thermal protection for the fuel channel, the heat shield assembly including a deflector positioned opposite from an end wall of the channel, in opposing relation to the fuel passage and in spaced-apart relation from the opposite end wall of the channel to allow fuel flow between the deflector and the opposite end wall, wherein the deflector diverts incoming fuel into the fuel channel and prevents a localized cold spot from being formed in the body directly across the channel from the fuel passage by cooler fuel received through the passage being applied directly against the fuel channel of a warmer body.

19. The fuel injector as in claim 18, wherein the deflector is formed unitary with the heat shield.

20. The fuel injector as in claim 18, wherein the deflector is formed as a separate piece from the heat shield and permanently fixed thereto.

21. The fuel injector as in claim 18, wherein the deflector is formed as a separate piece from the heatshield and is permanently fixed to the swirler body.

22. The fuel injector as in claim 18, wherein the deflector extends along a predetermined circumferential extent of the fuel channel to cause all the fuel received through the passage to be diverted, and has a width extending from one side to the other of the channel.

23. The fuel injector as in claim 18, wherein the deflector extends along a predetermined circumferential extent of the fuel channel to cause all the fuel received though the passage to be diverted, and has a width defining a gap between a side edge of the deflector, and one of the sidewalls of the fuel channel.

24. The fuel injector as in claim 18, wherein the deflector has one or more slots along its length to allow fuel to pass through the deflector, and between the deflector and the opposite wall of the swirler body, wherein the slots are located along the deflector at a location spaced from the discharge end of the fuel tube.

* * * * *